United States Patent Office 3,812,138
Patented May 21, 1974

---

3,812,138
PROCESS FOR PREPARING BENZOXAZOLONES-(2) AND BENZOTHIAZOLONES-(2)
Hartmut Heise, Neuenhain, Taunus, and Bernhard Mees, Konigstein, Taunus, Germany, assignors to Farbwerke Hoechst Aktiengesellschaft vormals Meister Lucius & Bruning, Frankfurt am Main, Germany
No Drawing. Filed June 23, 1972, Ser. No. 265,604
Claims priority, application Germany, June 24, 1971, P 21 31 366.6
Int. Cl. C07d 85/38, 91/44
U.S. Cl. 260—304    2 Claims

ABSTRACT OF THE DISCLOSURE

A process for preparing benzoxazolones-(2) and benzothiazolones-(2) having the general formula

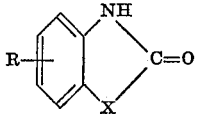

wherein R is a hydrogen or halogen atom, preferably a chlorine or bromine atom, an alkyl group having 1 to 3 carbon atoms, preferably a methyl group, an alkoxy group having 1 to 3 carbon atoms, preferably a methyl group and X is oxygen or sulfur.

The benzoxazolones-(2) or the benzothiazolones-(2) thus obtained are valuable intermediates for pharmaceutical products, for example analgetics, hypnotics, antipyretics and especially for dyestuffs such as azo dyestuffs.

---

The present invention relates to a process for preparing benzoxazolones-(2) and benzothiazolones-(2) having the general formula

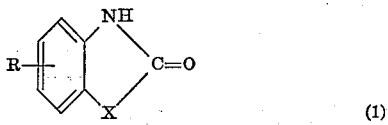  (1)

wherein R represents a hydrogen or halogen atom, preferably a chlorine or bromine atom, an alkyl group having 1 to 3 carbon atoms, preferably a methyl group, or an alkoxy group having 1 to 3 carbon atoms, preferably a methoxy group and X represents oxygen or sulfur, which comprises condensing urea in an aqueous solution and in the presence of acids at temperatures of from 20° to 160° C. with compounds of the general formula

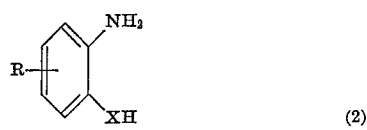  (2)

wherein R and X have the meanings given above.

The reaction conditions with regard to temperature, concentration and molar ratio of both reactants may be varied within relatively wide limits. The operation is carried out at temperatures from 20° to 160° C., preferably from 100° to 130° C., in order to obtain a high space/time yield. Water as reaction medium may be replaced completely or partly by organic solvents miscible with water such as methanol, ethanol or dimethyl formamide. At temperatures above 100° C. a pressure vessel is required.

As acids there are considered preferably sulfuric acid, hydrochloric acid, phosphoric acid or hydrobromic acid. These are added in such amounts as to achieve a pH value of the reaction mixture not exceeding 7 during the reaction.

The concentrations of o-aminophenol or o-aminothiophenol and urea in water may be varied within wide limits. The upper limit is fixed by the capability of the suspension formed being stirrable, whereas the concentrations of the reactants are decreased only to the point where the benzoxazolone-(2) or benzothiazolone-(2) formed is still precipitated and does not remain in dissolved form. An increase of concentrations generally has a favourable influence on the yield. Besides, the best possible concentration of the reactants depends to a large extent on the type of the substituents on the o-aminophenol or o-aminothiophenol. However, it is not difficult for the expert to find the best possible concentration by the way of preliminary experiments.

The urea is expediently used in excess, preferably in the ratio of 1.5 to 3 mols per mol, since it shows under the reaction conditions a certain tendency to decomposition.

In contradistinction to the process hitherto known for preparing benzoxazolone-(2) for example by reacting o-aminophenol with phosgene in a solvent or by reacting with urea in excess in the melt, the process according to the invention is characterized by the fact that the yields are higher, the use of toxic and corrosive gases is avoided and secondary reactions such as the formation of biuret, is only produced in trace amounts. Furthermore, the reaction products are so pure that it is unnecessary to precipitate or to recrystallize them. In comparison to the urea melting process, a smaller excess of urea can be used in the process of the present invention.

The present process makes it possible to use, instead of the solid o-aminophenol, aqueous solutions thereof, as these are formed for example in the hydrogenation of o-nitrophenol. The benzoxazolones - (2) or benzothiazolones-(2) thus obtained are valuable intermediates for pharmaceutical products, for example analgetics, hypnotics, antipyretics and especially for dyestuffs such as azo dyestuffs which contain as diazo components 4 - β-sulfato-ethyl-sulfonyl - 2 - hydroxyaniline (German Patent Specifications Nos. 1 126 542 and 1 153 029).

The following Examples illustrate the invention. Parts and percentages are by weight unless stated otherwise.

EXAMPLE 1

53 parts by volume of sulfuric acid monohydrate were added while stirring to a mixture of 109 parts of o-aminophenol and 72 parts by volume of water. When the formation of the salt was finished, 90 parts of urea were added to the suspension obtained, and the whole was heated to 115° C. After about 10 minutes a complete dissolution was reached. Within three and a half hours, 26.5 parts by volume of sulfuric acid monohydrate were added dropwise from a dropping funnel at 115° C., so that the pH value of the solution was maintained at about 2 to 3. When the addition of sulfuric acid was finished, the reaction was allowed to continue until the pH value of the suspension was decreased to 3–4:1000 parts by volume of water were added to the reaction mass, and the precipitated crystals were heated to 100° C. until complete dissolution. Thereafter the mixture was cooled to room temperature, the precipitated benzoxazolone-(2) was suction-filtered and washed with a small amount of cold water. 130 parts of benzoxazolone-(2) were obtained having a melting point of 139 to 140° C. The yield calculated on the o-aminophenol used was 96.5% of the theory.

EXAMPLE 2

250 parts of volume of concentrated hydrochloric acid were introduced into an autoclave, and 143 parts of 4-chloro-2-aminophenol and 180 parts of urea were added. After closing the pressure vessel, the remaining air was displaced by introducing nitrogen. Then the mixture was heated within an hour to 125° C., the mixture was maintained for half an hour at this temperature and cooled to room temperature. The precipitated crystal paste was introduced into 1500 parts by volume of water, the suspension was adjusted to pH 5–6 and heated for one hour to 100° C. After cooling the residue was suction-filtered and washed. 154 parts of 5-chloro-benzoxazolone having a melting point of 189° C. were obtained. The yield calculated on the 4-chloro-aminophenol used, amounted to 91% of the theory.

EXAMPLE 3

150 parts by volume of water, 127 parts of o-aminothiophenol, 55 parts by volume of sulfuric acid monohydrate and 120 parts of urea were introduced into an autoclave. The pressure vessel was closed and the remaining air was displaced by introducing nitrogen. Then the mixture was heated to 125° C. (while stirring) within one hour. After reaching this temperature, 53 parts by volume of sulfuric acid monohydrate were added in the course of one hour through a dosage valve and after that, 1000 parts by volume of water were added. Then the mixture was cooled to room temperature, the suspension was adjusted to pH 5–6 and the residue was filtered and washed. 144 parts of benzthiazolone-(2) having a melting point of 136° C. were obtained. The yield calculated on the o-aminothiophenol used, amounted to 94% of the theory.

Table I shows further compounds which were prepared in the same manner described above.

| Aminophenol used— | Product obtained— | Melting point, ° C. |
|---|---|---|
| 5-chloro-2-aminophenol | 6-chloro-benzoxazolone-(2) | 196 |
| 4-methyl-2-aminophenol | 5-methyl-benzoxazolone-(2) | 130 |
| 6-methyl-2-aminophenol | 7-methyl-benzoxazolone-(2) | 120 |
| 5-bromo-2-aminophenol | 6-bromo-benzoxazolone-(2) | 191 |
| 4-bromo-2-aminophenol | 5-bromo-benzoxazolone-(2) | 215 |
| 4-methyl-2-aminothiophenol | 5-methyl-benzthiazolone-(2) | 168–169 |
| 4-chloro-2-aminothiophenol | 5-chloro-benzthiazolone-(2) | 218 |
| 3-methoxy-2-aminophenol | 4-methoxy-benzoxazolone-(2) | 194 |
| 4-methoxy-2-mainophenol | 5-methoxy-benzoxazolone-(2) | 169–170 |
| 5-methoxy-2-aminophenol | 6-methoxy-benzoxazolone-(6) | 151 |
| 6-methyl-2-aminophenol | 7-methoxy-benzoxazolone-(2) | 148 |
| 3-chloro-2-aminothiophenol | 4-chloro-benzthiazolone-(2) | 204 |
| 5-methoxy-2-aminothiophenol | 6-methoxy-benzthiazolone-(2) | 163 |

What we claim is:
1. A process for preparing a benzoxazolone-(2) and a benzothiazolone-(2) having the general formula

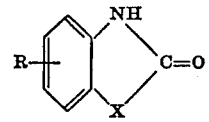

(1)

wherein R is a hydrogen or halogen atom, an alkyl group having 1 to 3 carbon atoms, or an alkoxy group having 1 to 3 carbon atoms, and X is oxygen or sulfur which comprises condensing urea in an aqueous solution and in the presence of mineral acids at temperatures of from 20° C. to 160° C. with a compound of the general formula

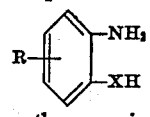

(2)

wherein R and X have the meanings given above.
2. A process as defined in claim 1, wherein the molar ratio of o-aminophenol or o-aminothiophenol to urea amounts to about 1:1.5 to 1:3.

References Cited

Bywater et al., J. Am. Chem. Soc., 67, 905–7 (1945).

RICHARD J. GALLAGHER, Primary Examiner

U.S. Cl. X.R.

260—157, 158, 307 C, 999